No. 869,331. PATENTED OCT. 29, 1907.
W. C. RUNGE.
REGULATING DEVICE FOR MOTORS.
APPLICATION FILED MAY 18, 1906.

WITNESSES
Max B. A. Doring.
Conrad Diehl

Walter C. Runge, INVENTOR,
BY Robt B Killgore
ATTORNEY

UNITED STATES PATENT OFFICE.

WALTER C. RUNGE, OF CAMDEN, NEW JERSEY, ASSIGNOR TO INTERNATIONAL ROYAL PHONE COMPANY, OF BOSTON, MASSACHUSETTS, A CORPORATION OF MAINE.

REGULATING DEVICE FOR MOTORS.

No. 869,331.   Specification of Letters Patent.   Patented Oct. 29, 1907.

Application filed May 18, 1906. Serial No. 317,514.

*To all whom it may concern:*

Be it known that I, WALTER C. RUNGE, a citizen of the United States, residing at Camden, Camden county, New Jersey, have invented a new and useful Improvement in Regulating Devices for Motors, of which the following is a specification.

My object is to produce a regulating device, controlled by a single moving part, which will start or stop the motor, and which will regulate the speed thereof within desired limits.

Figure 1:
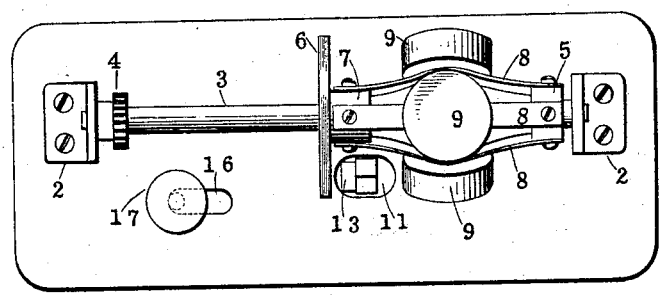
Figure 2:
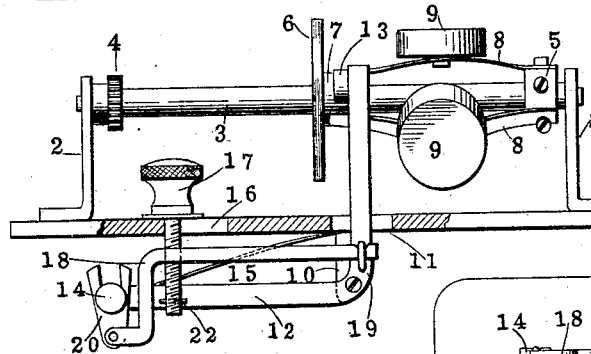
Figure 5:
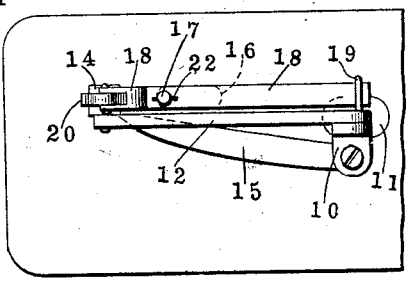
Figure 3:
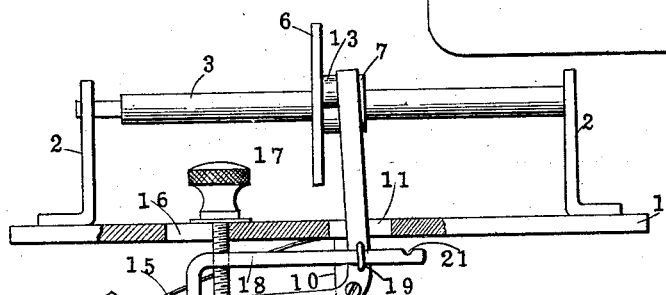
Figure 4:
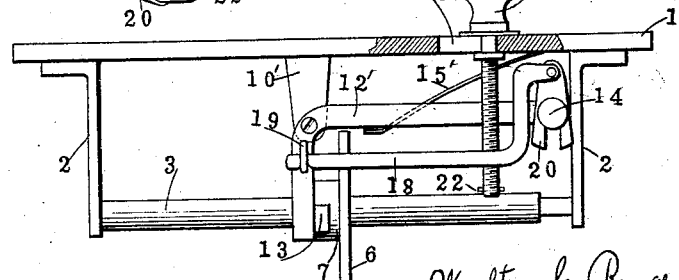

I accomplish the object in the manner shown in the accompanying drawing in which Figure 1 is a top view of my new device in its preferred form; Fig. 2 a side view of the structure shown in Fig. 1 with the governor in open position; Fig. 3 a view of the structure shown in Fig. 1 with the governor in closed position; Fig. 4 a modification of the structure shown in Fig. 1; and Fig. 5 a bottom view of the structure shown in Fig. 2.

Like reference characters designate like parts throughout.

The usual bed plate 1 of the motor carries brackets 2, 2 in which a governor shaft 3 is pivoted. A pinion 4 on the shaft 3 meshes with a driving gear forming part of the motor proper. A collar 5 is secured to the shaft 3 near one end. A friction disk 6 is mounted on the sleeve 7 which is free to slide on the shaft 3. Springs 8, 8, 8 are secured to the collar 5 and sleeve 7 and carry governor balls 9, 9, 9. These parts constitute the ordinary friction disk governor and the parts constituting it will be hereinafter referred to as the governor.

A lug or ear 10 is secured to the plate 1 adjacent to a slot 11 therein. A bent lever is pivoted to the lug 10 and has one leg extending through the slot 11. The end of this leg of the lever carries a friction pad 13 adapted to bear against the disk 6. A stud 14 is secured to the other end of the lever 12. A spring 15 is secured to the bed plate 1 and bears on the lever 12 for a purpose hereinafter explained. Another slot 16 is made in the plate 1 through which the controlling screw 17 passes. The screw 17 engages a second bent lever 18 which lever passes through a loop 19 on the lever 12 adjacent to the point where it is pivoted to the lug 10.

A yoke 20 is pivoted to the end of the lever 18 with the horns straddling the stud 14. The opposite end is provided with a notch for a purpose hereinafter described. A stop 22 on the screw 17 limits its motion.

When the motor is at a standstill the parts assume the position shown in Fig. 3 in which the friction pad 13 bears heavily against the disk 6 thereby braking the motor, the spring 15 bearing on the lever carrying the pad. When the screw 17 is pushed to the opposite end of the slot 16 the yoke 20 assumes the vertical position shown in Figs. 2 and 4 thereby lifting the end of the lever 12 and moving the pad 13 away from the disk. The motor then starts up the weights and springs traveling outward until the disk bears against the pad when a constant speed is maintained. The notch 21 engages the loop 19 and locks the parts against accidental displacement. To change the speed the screw 17 is revolved and the entire lever system raised or lowered changing the relative positions of the pad 13 and disk 6. To stop the motor the screw 17 is pushed back to its initial position when the pad brakes the disk and stops the motor.

It is apparent that the pad 13 will always resume its initial position and bear against the disk to brake the motor when the yoke 20 is in its inclined position irrespective of the position of the pad 13 when the yoke is in its vertical position.

By this construction I obtain a start and stop device combined with a regulating device which is controlled from a single screw or knob, which is positive in action, and cheaply and easily manufactured.

In Fig. 4 the lug 10' is made longer to obtain sufficient clearance and is secured to the same side of the plate 1 as the governor. The shortened lever 12' is pivoted thereto, carrying the usual loop 19 and stud 14, the friction pad 13 being mounted on the end adjacent to the governor disk. The spring 15' pulls the lever system upwards and the control is effected by the screw 17' working in the slot 16. In this modification the parts are reversed so that the governor and the controlling levers are on the same side of the plate and nothing but the knob on the screw is exposed. This modification involves no change in either principle or mode of operation.

I claim:—

1. A regulating device for motors comprising a plate; a friction governor thereon; a lever pivoted to the plate one end of which lever is adapted to frictionally engage the governor, a stud at the other end; a second lever slidably engaging the first; a yoke pivotally secured to the second lever, and engaging the stud on the first; means acting on the levers for varying the position of the end of the first lever with respect to the governor; and means for maintaining the parts in relative position.

2. A regulating device for motors comprising a support, a governor thereon, a lever pivotally secured to the support, one end of which lever is adapted to frictionally engage the governor; a second lever engaging the first and movable longitudinally to start and stop the motor, and also movable vertically to vary the speed thereof; a single means for effecting the two motions; and means for maintaining the parts in relative position.

3. A regulating device for motors comprising a plate; a governor thereon; a bent lever pivotally secured thereto, one end of which is adapted to frictionally engage the governor; a stud on the other end; a loop on the lever near its pivotal point; a second lever slidable in said loop; there being means for detachably locking the levers together when the governor is in open position; a yoke pivotally secured to the end of the second lever and engaging the stud on the first; means for moving the second lever longitudinally to swing the yoke and oscillate the first lever to start and stop the motor, and also for moving both levers to vary the speed of the motor; and a spring bearing on the first lever to hold the parts in position.

4. A regulating device for motors comprising a support; a governor thereon; a bent lever pivotally mounted on the support, one end of which is adapted to frictionally engage the governor; a second lever mounted on and slidably engaging the first and co-acting therewith to move it with respect to the governor; means for maintaining the parts in relative position; and means acting on the levers to move the end of the bent lever with respect to the governor.

In testimony whereof I have hereunto subscribed my name in the presence of two attesting witnesses.

WALTER C. RUNGE.

Witnesses:
 ROBT. B. KILGORE,
 D. P. WOLHAUPTER.